M. C. FRENCH.
PLOW.
APPLICATION FILED JULY 7, 1919.
1,333,970.
Patented Mar. 16, 1920.
2 SHEETS—SHEET 1.
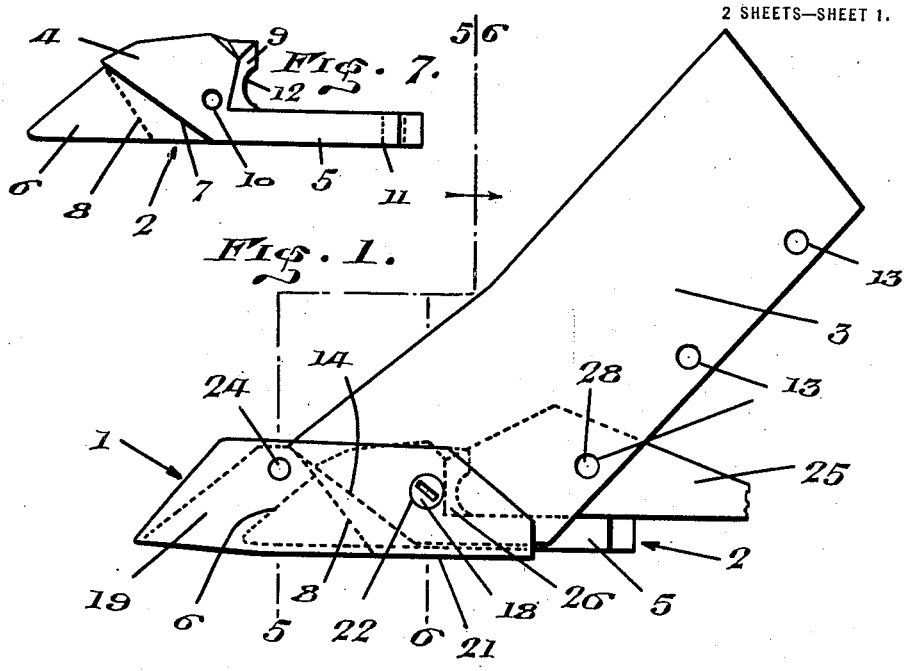
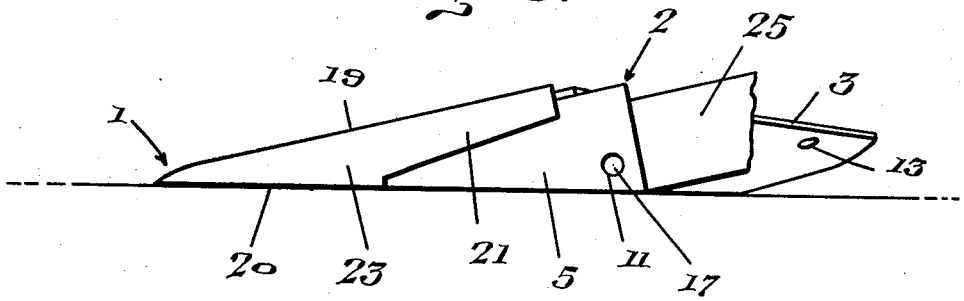
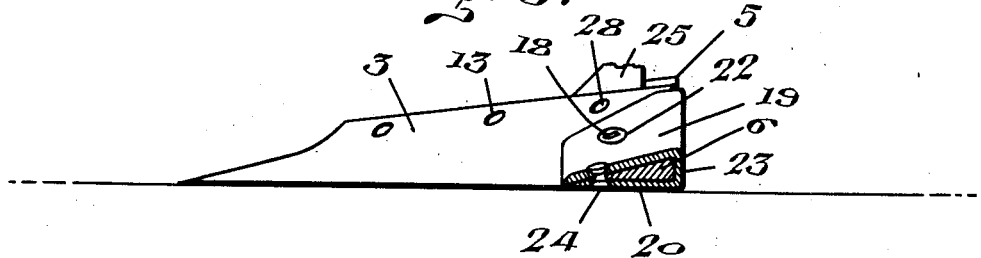
Inventor
Morgan C. French
By W. J. FitzGerald
Attorney
Witness

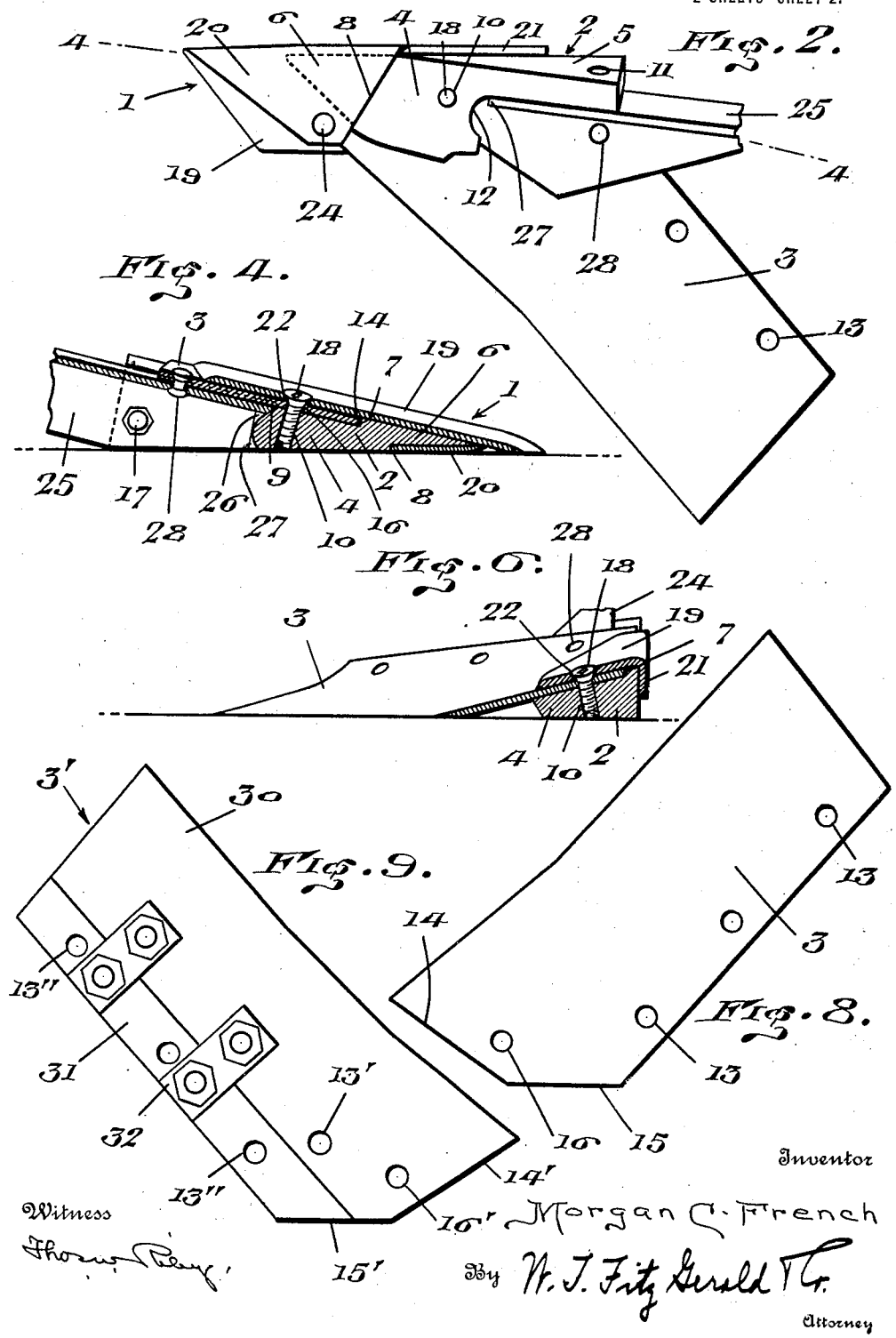

UNITED STATES PATENT OFFICE.

MORGAN C. FRENCH, OF CRAIG, COLORADO.

PLOW.

1,333,970.  Specification of Letters Patent.  Patented Mar. 16, 1920.

Application filed July 7, 1919. Serial No. 308,953.

*To all whom it may concern:*

Be it known that I, MORGAN C. FRENCH, a citizen of the United States, residing at Craig, in the county of Moffat and State of Colorado, have invented certain new and useful Improvements in Plows; and I do hereby declare the following to be a full, clear, and exact description of the invention, such as will enable others skilled in the art to which it appertains to make and use the same.

The present invention relates to plows, and is particularly an improvement over the plow disclosed in my copending application, Serial No. 278,883, filed Feb. 24, 1919.

The invention has for its object the provision of a plow structure embodying a novel and improved construction and assemblage of the component elements, including a removable plow point and share, which can be detached for the purpose of repairs or replacement.

A further object is to provide in such a plow structure, a member to which the share and plow point are attached, said member, share and plow point being formed to be secured together in an efficient and desirable manner.

A still further object is the provision of a novel slip point for the plow, and means for attaching it to the share.

The invention also has for its object the provision of such improvements which can be incorporated in plows already in use as well as those manufactured with the improvements, the improvements being comparatively simple and inexpensive and providing for the foregoing and other benefits.

With the foregoing and other objects in view, which will be apparent as the description proceeds, the invention resides in the construction and arrangement of parts hereinafter described and claimed, it being understood that changes can be made without departing from the spirit of the invention.

The invention is illustrated in the accompanying drawings, wherein:—

Figure 1 is a plan view of the improved construction.

Fig. 2 is a bottom perspective view thereof.

Fig. 3 is a land-side view.

Fig. 4 is a section taken on the line 4—4 of Fig. 2.

Figs. 5 and 6 are cross sections taken on the respective lines 5—5 and 6—6 of Fig. 1.

Fig. 7 is a plan view of the attaching member.

Fig. 8 is a plan view of the share.

Fig. 9 is a rear view of a modified form of share.

In carrying out the invention, the plow point 1 is assembled with the share 3 by means of an attaching member 2, having a flange 4 extending away from the land side with its lower face horizontal to ride on the bottom of the furrow, and said member is provided with a rearwardly extending vertical land side flange 5. At its forward end, the member 2 has a forwardly extending tongue 6 which tapers to a point in the plane of the flange 5, and said tongue 6 is of triangular section as seen in Fig. 5. The member 2 has an upper oblique shoulder 7 facing rearwardly, and a lower oblique shoulder 8 facing forwardly and the flange 4 is provided in rear of the shoulder 7 with a threaded aperture 10. The rear end of the flange 4 has an upper bevel 9, and a notch 12 for the engagement of the frog as will hereinafter more fully appear. The flange 5 is provided near its rear end with an aperture 11 for the reception of securing means.

The share 3, comprising a suitable blade of metal, is provided along its rear edge with apertures 13 for the attachment of the mold board. The forward end of the share 3 is cut off longitudinally, as at 15, to overlap and bear on the flange 5, and is cut off obliquely as at 14, from the edge 15 to the forward edge of the share. The forward end of the share overlaps and bears on the flanges 4 and 5 of the attaching member 2, with the oblique edge 14 abutting the shoulder 7, flush with the tongue 6, as seen in Fig. 4. The share has an aperture 16 near its forward end to register with the aperture 10 of said member 2 for the reception of a clamping bolt 18 which extends downwardly through the aperture 16 and screws into the aperture 10. The share is thus clamped on the member 2, and the edge 14 in fitting the shoulder 7, will hold said share and member in relative position.

The plow point 1 is bent from a blank of sheet metal, which is doubled on a longitudinal line, to provide the upper and lower flanges 19 and 20, respectively, extending away from the land side, and connected at the land side by the land side web 23 which extends rearwardly to form the depending land side flange 21 along the corresponding edge of the flange 19 which extends rearwardly and upwardly at an angle beyond the flange 20. The flanges 19 and 20 converge to their edges which are in contact, and said edges of the flanges are secured together by means of a rivet 24, or the like, engaging therethrough, thus providing a socket between said flanges opening rearwardly. The forward edge of the flange 20 fits under and abuts the flange 19, as seen in Fig. 4, and the forward edge of the flange 19 is sharpened and disposed obliquely. This plow point is slipped rearwardly into engagement with the attaching member 2, the tongue 6 moving snugly into the socket of the plow point between the flanges 19 and 20, and the rear oblique edge of the flange 20 abutting the shoulder 8 flush with the lower surface of the flange 4. The flange 21 overlaps and bears snugly against the outer side of the flange 5, and the rear edge portion of the flange 19 forms a shank which extends rearwardly and overlaps the forward end portion of the share 3. The flange 19 has an aperture 22 near its rear end to snugly receive the upper head of the bolt 18, whereby said bolt in being tightened clamps the flange 19, share 3 and member 2 together, with the share held firmly between the flange 19 and member 2, thereby rigidly holding the parts in place. The plow point in fitting snugly over the tongue 6 will be made secure, and by removing the bolt 18, the plow point can be slipped off for purpose of sharpening, repair or replacement.

The regular land side can be bolted to the outer side of the flange 5 by means of a bolt 17 extending through the aperture 7.

The frog 25 of the plow extends forwardly under the share 3 as usual at the inner side of the flange 5, and the forward end of the frog is beveled as at 26, to overlap the bevel 9 of the member 2, snugly under the share 3, as seen in Fig. 4, and said frog is cut away as at 27, to permit of the portion 26 passing over the bevel 9. The notch 12 accommodates the frog, and said frog is secured to the flange 5 by the bolt 17, thereby securing said land side flange 5 to the frog, which, in addition to the engagement of the forward end of the frog and flange 4, provide a secure connection. The frog is also secured to the share 3 by means of a rivet, bolt or other securing member 28 engaging through the frog and one of the apertures 13. In removing the several parts of the plow, the removal of the bolt 18 permits the plow point to be slipped off. Then, the removal of the bolt 17 permits the member 2 to be withdrawn from the frog under the share, and the removal of the bolt or securing member 28 then detaches the share from the frog.

The present construction provides for a thoroughly efficient and practical plow, the point of which can readily be removed for sharpening, repair or replacement, and said point being formed from sheet metal, can be inexpensively manufactured in order that the plow point can be renewed from time to time at small cost. By shaping the forward end of the frog 25 and share 3 of an ordinary plow to receive the member 2, the improvements can be used in ordinary plows, enabling the removable plow point to be used.

Fig. 9 illustrates a modified form of share 3' including the blade 30 and repair back 31. This repair back 31 has apertures 13'' for attachment to the mold board, and said repair back is of good material and remains permanent with the mold board during the use thereof. The blade 30 is detachable from the repair back or bar 31, being fastened thereto by means of clips 32 bolted to the rear surfaces of the blade 30 and bar 31, said blade 30 having apertures 13' for the reception of the bolts. The share 3' has the edges 14' and 15' similar to the share 3, and also the aperture 16' for the engagement of the bolt 18.

Having thus described the invention, what is claimed as new is:—

1. A plow including an attaching member, a share overlapping said member, a removable point having a flange overlapping said share, said member and point having portions to fit together, and means securing said flange to said member and clamping the share between them.

2. A plow including an attaching member having an upward rearwardly facing shoulder, a share overlapping said member and abutting said shoulder, a removable point having a flange overlapping said share, said member and point having means to fit together in front of said shoulder, and means securing said flange to said member and clamping the share between them.

3. A plow including an attaching member, a share overlapping said member and having an edge at the land side of said member, a removable plow point having a rearwardly extending flange overlapping the share and a depending flange overlapping the land side of said member and extending across said edge of the share, said member and point having interengagable portions, and means for clamping the first named flange, share and member together.

4. A plow including an attaching member having an upper rearwardly facing shoulder, a share overlapping said member and having an edge at the land side of the said member and an edge abutting shoulder, a removable point having a rearwardly extending flange overlapping the share and a depending flange overlapping the land side of said member across the first named edge of the share, said member and point having interengageable portions, and means securing the first named flange and member together and clamping the share between them.

5. A plow including an attaching member having a lower horizontal surface, a lower forwardly facing shoulder and a forwardly extending tongue, a removable point having upper and lower flanges and a socket between them to snugly receive said tongue, the lower flange being arranged to abut said shoulder, and means for securing the upper flange on said member.

6. A plow including an attaching member having a lower forwardly facing shoulder, an upper rearwardly facing shoulder, and a forwardly extending tongue, a share overlapping said member and abutting the rearwardly facing shoulder, a removable point having upper and lower flanges and a socket between them receiving said tongue, the lower flange abutting the forwardly facing shoulder, the upper flange overlapping the share, and means securing said upper flange to said member and clamping the share between them.

7. A plow including an attaching member having an upper rearwardly facing shoulder, a lower forwardly facing shoulder, and a forwardly extending tongue, a share overlapping said member and having an edge at the land side of said member and another edge abutting the rearwardly facing shoulder, a removable point having upper and lower flanges and a socket between them receiving said tongue, the lower flange abutting the forwardly facing shoulder and the upper flange extending rearwardly and overlapping the share, said point having a depending flange overlapping the land side of the said member across the first named edge of the share, and means securing said upper flange, share and member together.

8. A removable plow point having a land side web, upper and lower flanges converging from said web away from the land side, the upper flange extending rearwardly beyond the lower flange and the web extending rearwardly and forming a depending flange along said upper flange, and means securing the edges of said upper and lower flanges together.

9. A plow embodying an attaching member having a land side flange and a flange extending away from the land side, a share overlapping said member, a removable point engaging said member, means for securing said point and share on said member, and a frog extending under the share along said land side flange, the rear end of the second named flange being formed for the engagement of the frog thereover under the share, and said frog and land side flange having means for attaching them together.

In testimony whereof I have signed my name to this specification.

MORGAN C. FRENCH.